United States Patent
Cui et al.

(10) Patent No.: US 12,471,881 B1
(45) Date of Patent: Nov. 18, 2025

(54) SYSTEM FOR DETECTING MYOCARDIAL DAMAGE BASED ON IMAGING CHARACTERISTICS

(71) Applicant: The First Affiliated Hospital of Guangzhou Medical University (Guangzhou Respiratory Center), Guangzhou (CN)

(72) Inventors: Tongtao Cui, Guangzhou (CN); Siqi Wang, Guangzhou (CN); Tao Guo, Guangzhou (CN); Zeyang Fang, Guangzhou (CN); Youliang Wu, Guangzhou (CN); Yunyun Zhang, Guangzhou (CN); Rongmao He, Guangzhou (CN)

(73) Assignee: The First Affiliated Hospital of Guangzhou Medical University (Guangzhou Respiratory Center), Guangzhou (CN)

( * ) Notice: Subject to any disclaimer, the term of this patent is extended or adjusted under 35 U.S.C. 154(b) by 0 days.

(21) Appl. No.: 19/233,793

(22) Filed: Jun. 10, 2025

Related U.S. Application Data

(63) Continuation of application No. PCT/CN2025/087441, filed on Apr. 7, 2025.

(30) Foreign Application Priority Data

Aug. 28, 2024 (CN) .......................... 202411188672.X

(51) Int. Cl.
*A61B 5/00* (2006.01)
*A61B 5/055* (2006.01)
(Continued)

(52) U.S. Cl.
CPC .......... *A61B 8/0883* (2013.01); *A61B 5/0035* (2013.01); *A61B 5/0044* (2013.01);
(Continued)

(58) Field of Classification Search
CPC ....... A61B 8/0883; A61B 8/463; A61B 8/488; A61B 8/5223; A61B 8/5261;
(Continued)

(56) References Cited

U.S. PATENT DOCUMENTS

2004/0153128 A1* 8/2004 Suresh ................... G16H 30/20
600/407

FOREIGN PATENT DOCUMENTS

| CN | 112259227 A | 1/2021 |
| CN | 114569159 A | 6/2022 |

(Continued)

OTHER PUBLICATIONS

Title of the Item: China Excellent Master's Thesis Full-text Database (Electronic Journal) Publication Date: Dec. 31, 2023Name of the Author: Tang MinArticle Title: Research on brain tumor MRI image segmentation based on Attention Res-Unetpp. E070-837.

*Primary Examiner* — Joel F Brutus
(74) *Attorney, Agent, or Firm* — Nitin Kaushik

(57) ABSTRACT

The present invention provides a system for detecting myocardial damage based on imaging characteristics, which comprises an image acquisition module, a feature extraction module, a data processing module, and a report generation module. The image acquisition module is configured to acquire high-resolution cardiac imaging data; the feature extraction module is configured to extract cardiac structural and functional feature information from the acquired imaging data; the data processing module is configured to analyze and identify myocardial damage based on the extracted feature information; the report generation module is config-
(Continued)

ured to generate medical reports for physicians regarding myocardial damage. The present invention provides a more comprehensive and accurate assessment of myocardial damage by performing a comprehensive analysis of the patient's cardiac imaging data, thereby enhancing the accuracy and effectiveness of medical diagnosis.

2 Claims, 3 Drawing Sheets

(51) Int. Cl.
| | |
|---|---|
| A61B 8/00 | (2006.01) |
| A61B 8/08 | (2006.01) |
| G01R 33/48 | (2006.01) |
| G01R 33/56 | (2006.01) |
| G06T 7/00 | (2017.01) |
| G06T 7/12 | (2017.01) |
| G06T 7/136 | (2017.01) |
| G06V 10/40 | (2022.01) |
| G06V 10/74 | (2022.01) |
| G06V 10/82 | (2022.01) |
| G16H 10/60 | (2018.01) |
| G16H 30/20 | (2018.01) |

(52) U.S. Cl.
CPC ............ *A61B 5/055* (2013.01); *A61B 5/7264* (2013.01); *A61B 5/7425* (2013.01); *A61B 8/463* (2013.01); *A61B 8/488* (2013.01); *A61B 8/5223* (2013.01); *A61B 8/5261* (2013.01); *G01R 33/4814* (2013.01); *G01R 33/5608* (2013.01); *G06T 7/0014* (2013.01); *G06T 7/12* (2017.01); *G06T 7/136* (2017.01); *G06V 10/40* (2022.01); *G06V 10/761* (2022.01); *G06V 10/82* (2022.01); *G16H 10/60* (2018.01); *G16H 30/20* (2018.01); *G06T 2207/10088* (2013.01); *G06T 2207/20084* (2013.01); *G06T 2207/20221* (2013.01); *G06T 2207/30048* (2013.01); *G06V 2201/031* (2022.01)

(58) Field of Classification Search
CPC ..... A61B 5/0035; A61B 5/0044; A61B 5/055; A61B 5/7264; G06T 7/12; G06T 7/136
See application file for complete search history.

(56) References Cited

FOREIGN PATENT DOCUMENTS

| | | |
|---|---|---|
| CN | 114699106 A | 7/2022 |
| CN | 115462833 A | 12/2022 |

* cited by examiner

S11: Acquire MRI image data from the preprocessed imaging data; the MRI image data includes cardiac cross-sectional image data at multiple time points within multiple cardiac cycles S12: For all cross-sectional image data, perform threshold segmentation method to obtain cardiac boundary and internal contour information corresponding to each cardiac cross-sectional image S13: For the images at multiple time points on each cross-section, perform fusion based on the cardiac edge and internal contour information corresponding to each image to obtain standardized fusion images for each cross-section S14: Input the standardized fused images on all cross-sections into a pre-trained CNN feature recognition model to obtain the structural features of the patient's heart

FIG. 2

SYSTEM FOR DETECTING MYOCARDIAL DAMAGE BASED ON IMAGING CHARACTERISTICS

CROSS-REFERENCE TO RELATED APPLICATIONS

The application claims priority to Chinese patent application No. 202411188672X, filed on Aug. 28, 2024, the entire contents of which are incorporated herein by reference.

TECHNICAL FIELD

The present invention relates to the technical field of medical detection systems, and in particular to a system for detecting myocardial damage based on imaging characteristics.

BACKGROUND

With the continuous increase in the incidence of cardiovascular diseases, early detection and accurate assessment of myocardial damage have become increasingly important. Conventional myocardial detection methods mainly rely on individual imaging techniques or physiological parameters, which fail to comprehensively reflect the overall cardiac health. Particularly in clinical diagnosis, accurate assessment of the type, severity and deterioration trend of myocardial damage is crucial for formulating effective treatment plans. In the prior art, although some medical imaging systems can calculate and display myocardial contractility in real time, these systems usually focus on the analysis of individual functional parameters and lack comprehensive assessment of both myocardial structural and functional features. This limitation makes it difficult for physicians to obtain comprehensive and accurate information during diagnostic and treatment, affecting the scientific validity and effectiveness of clinical decision-making.

Upon reviewing related publicly disclosed technical solutions, the technology with publication No. CN115462833A discloses a medical imaging system. The system is configured to calculate and display myocardial contractility in real time, comprising an input module, a computational module, and an output module. The input module acquires parameter values of myocardial contraction detected by medical imaging devices; the computational module calculates the patient's myocardial contractility indices based on the parameter values; the output module transmits the calculated indices to the medical imaging devices and displays them on the device's screen. This invention combines physical and mechanical formulas with cardiac imaging measurement results to calculate myocardial contractility in real time and display it on the device's screen, which facilitates in-depth research on the cardiac myocardial mechanical properties using medical imaging devices, opens up new research fields, and expands the scope of clinical and research applications for such devices. However, although this solution can calculate and display myocardial contractility in real time, it is limited to the analysis of individual mechanical properties and lacks a comprehensive assessment of both the type and severity of myocardial damage.

SUMMARY

The object of the present invention is to address the existing deficiencies, and provide a system for detecting myocardial damage based on imaging characteristics.

The present invention adopts the following technical solution:

A system for detecting myocardial damage based on imaging characteristic, which comprises an image acquisition module, a feature extraction module, a data processing module, and a report generation module.

The image acquisition module is configured to acquire high-resolution cardiac imaging data; the feature extraction module is configured to extract cardiac structural and functional feature information from the acquired imaging data; the data processing module is configured to analyze and identify myocardial damage based on the extracted feature information; the report generation module is configured to generate medical reports for physicians regarding myocardial damage.

The image acquisition module comprises an imaging acquisition unit and an imaging preprocessing unit; the image acquisition unit is configured to acquire the patient's cardiac imaging data by utilizing high-resolution medical imaging devices, comprising MRI image data and Doppler imaging data within multiple cardiac cycles; the imaging preprocessing unit is configured to preprocess the acquired imaging data.

The feature extraction module comprises an anatomical feature extraction unit and a functional feature extraction unit; the anatomical feature extraction unit is configured to extract structural features of the patient's heart based on the preprocessed imaging data; the functional feature extraction unit is configured to extract functional features of the patient's heart based on the preprocessed imaging data.

Further, the data processing module comprises a myocardial injury analysis unit and a deterioration severity assessment unit; the myocardial injury analysis unit analyzes the type and severity level of the patient's myocardial damage based on the structural features and functional features of the patient's heart; the deterioration severity assessment unit evaluates the deterioration trend of the patient's myocardial damage by incorporating analytical data on the patient's myocardial damage from historical data.

Further, the anatomical feature extraction unit performs the extraction of the structural features of the patient's heart through the following steps:

S11: Acquire MRI image data from the preprocessed imaging data; the MRI image data includes cardiac cross-sectional image data at multiple time points within multiple cardiac cycles;

S12: For all cross-sectional image data, perform threshold segmentation method to obtain cardiac boundary and internal contour information corresponding to each cardiac cross-sectional image;

S13: For the images at multiple time points on each cross-section, perform fusion based on the cardiac edge and internal contour information corresponding to each image to obtain standardized fusion images for each cross-section;

S14: Input the standardized fused images on all cross-sections into a pre-trained CNN feature recognition model to obtain the structural features of the patient's heart.

Specifically, in the step S13, the standardized fused image of each cross-section is obtained through the following steps:

S131: For each cross-section, calculate the similarity of the edge contour between each image in the cross-section and all other images in the same cross-section:

$$D(C_i, C_j) = \max\{\sup_{x \in C_i} \inf_{y \in C_j} \|x-y\|, \sup_{y \in C_j} \inf_{x \in C_i} \|x-y\|\};$$

Wherein, $D(C_i, C_j)$ represents the similarity of the edge contour between a certain image i and a certain image j on the same cross-section; $C_i$ represents the set of points of the cardiac edge and internal contour of a certain image i on the cross-section; $C_j$ represents the set of points of the cardiac edge and internal contour points of a certain image j on the cross-section; x represents a certain point within the set $C_j$; y represents a certain point within the set $C_j$; $\|x-y\|$ represents the Euclidean distance between point x and point y; inf represents the infimum operator, which indicates finding the minimum value among all possible values, and $\inf_{y \in C_j} \|x-y\|$ represents to find the value that minimizes $\|x-y\|$ among all possible $y \in C$; sup represents the supremum operator, which indicates finding the maximum value among all possible values, and $\sup_{x \in C_i} \inf_{y \in C_j} \|x-y\|$ represents to find the value that maximizes $\inf_{y \in C_j} \|x-y\|$ among all possible $x \in C_i$;

S132: Set a similarity threshold ε, and put all images with edge contour similarity less than the similarity threshold into the same group, and in each group, the edge contour similarities between any two images are all less than the similarity threshold E; suppose there are n groups in total;

S133: Fuse the images in each group:

$$L_k = \frac{1}{k_m} \sum_{p=1}^{k_m} L_{k,p};$$

$L_k$ represents the fused image in the k-th group; km represents the total number of images in the k-th group; $L_{k,p}$ represents the p-th image in the k-th group;

S134: Perform comprehensive fusion on the fused images of each group to obtain the standardized fused image of the cross-section:

$$L_b = \sum_{k=1}^{n} \frac{L_k \cdot \left(1 + \ln\left(1 + \frac{\beta \cdot k_m}{M}\right)\right)}{\sum_{k=1}^{n} \left(1 + \ln\left(1 + \frac{\beta \cdot k_m}{M}\right)\right)};$$

$L_b$ represents the standardized fused image corresponding to cross-section b; β represents an amplification coefficient with a value greater than 1; M represents the total number of images on cross-section b.

Further, the functional feature extraction unit performs imaging analysis by combining cardiac MRI image data and Doppler imaging data to obtain the functional features of the patient's heart.

Further, the myocardial injury analysis unit performs a quantitative assessment of the type and severity of myocardial damage by integrating and concatenating the structural and functional features of the patient's heart into a pre-trained myocardial damage neural network recognition model.

The beneficial effects achieved by the present invention are as follows:

The present invention accurately extracts structural and functional features of the patient's heart by comprehensively utilizing high-resolution cardiac imaging data and Doppler imaging data; by preprocessing and fusing imaging data at multiple time points, a standardized fused image is obtained, which improves the quality and consistency of imaging data, thereby ensuring accurate generation of structural features; by inputting the extracted structural and functional features into a pre-trained neural network recognition model for myocardial damage, the present invention performs a quantitative assessment of the type and severity of myocardial impairment; through historical quantitative assessment results, the deterioration trend of the patient's myocardial damage is obtained, further providing physicians with a more comprehensive and accurate diagnostic basis, effectively improving the accuracy of myocardial damage detection, and further improving the scientific validity of medical decision-making and treatment effect.

BRIEF DESCRIPTION OF DRAWINGS

The present invention can be further understood by referring to the following description in conjunction with the accompanying drawings. Components in the drawings are not necessarily drawn to scale, with the emphasis instead being placed on illustrating the principles of the embodiments. Identical reference numerals designate corresponding parts in different views.

FIG. 2 is a schematic diagram of the workflow of the anatomical feature extraction unit of the present invention.

DETAILED DESCRIPTION OF THE EMBODIMENTS

Figure 1:
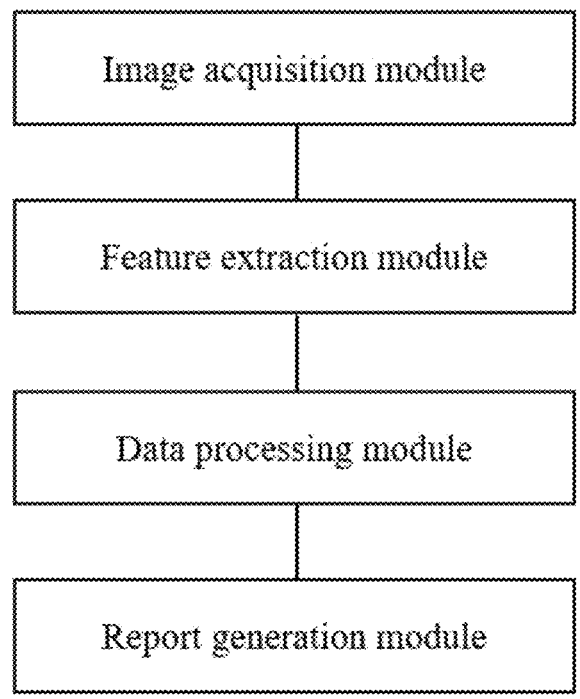
FIG. 1 is a schematic diagram of the overall modules of the present invention.

To make the objects, technical solutions, and advantages of the present invention more clearly understood, the present invention is further described in detail below in conjunction with the embodiments. It should be understood that the specific embodiments described herein are merely used to explain the present invention and are not intended to limit the present invention. Other systems, methods, and/or features of the embodiments will be apparent to those skilled in the art after reviewing the following detailed description. All such additional systems, methods, features, and advantages are included in this specification, are within the scope of the present invention, and are protected by the appended claims. Additional features of the disclosed embodiments are described in the following detailed description and will be apparent from the following detailed description.

In the drawings of the present invention's embodiments, identical or similar reference numerals denote identical or similar components. In the description herein, terms such as "upper", "lower", "left", and "right" that indicates orientations or positional relationships are based on the views shown in the drawings. These terms are used solely for the convenience of describing the present invention and simplifying the description, and do not indicate or implying that the referenced apparatus or components must have a specific orientation or be constructed and operated in specific orientation. Therefore, terms describing positional relationships in the drawings are for illustrative purposes only and should not be construed as limiting the present invention. Those of ordinary skill in the art will understand the specific meanings of the above terms in the context of particular embodiments.

Embodiment 1

As shown in FIG. 1, this embodiment provides a system for detecting myocardial damage based on imaging characteristics, which comprises an image acquisition module, a feature extraction module, a data processing module, and a report generation module.

The image acquisition module is configured to acquire high-resolution cardiac imaging data; the feature extraction module is configured to extract cardiac structural and functional feature information from the acquired imaging data; the data processing module is configured to analyze and identify myocardial damage based on the extracted feature information; the report generation module is configured to generate medical reports for physicians regarding myocardial damage.

The image acquisition module comprises an imaging acquisition unit and an imaging preprocessing unit; the image acquisition unit is configured to acquire the patient's cardiac imaging data by utilizing high-resolution medical imaging devices, comprising MRI image data and Doppler imaging data within multiple cardiac cycles; the imaging preprocessing unit is configured to preprocess the acquired imaging data.

The feature extraction module comprises an anatomical feature extraction unit and a functional feature extraction unit; the anatomical feature extraction unit is configured to extract structural features of the patient's heart based on the preprocessed imaging data; the functional feature extraction unit is configured to extract functional features of the patient's heart based on the preprocessed imaging data.

The data processing module comprises a myocardial injury analysis unit and a deterioration severity assessment unit; the myocardial injury analysis unit analyzes the type and severity level of the patient's myocardial damage based on the structural features and functional features of the patient's heart; the deterioration severity assessment unit evaluates the deterioration trend of the patient's myocardial damage by incorporating analytical data on the patient's myocardial damage from historical data.

Further, as shown in FIG. 2, the anatomical feature extraction unit performs the extraction of the structural features of the patient's heart through the following steps:

S11: Acquire MRI image data from the preprocessed imaging data; the MRI image data includes cardiac cross-sectional image data at multiple time points within multiple cardiac cycles;

S12: For all cross-sectional image data, perform threshold segmentation method to obtain cardiac boundary and internal contour information corresponding to each cardiac cross-sectional image;

S13: For the images at multiple time points on each cross-section, perform fusion based on the cardiac edge and internal contour information corresponding to each image to obtain standardized fusion images for each cross-section;

S14: Input the standardized fused images on all cross-sections into a pre-trained CNN feature recognition model to obtain the structural features of the patient's heart.

Specifically, in the step S13, the standardized fused image of each cross-section is obtained through the following steps:

S131: For each cross-section, calculate the similarity of the edge contour between each image in the cross-section and all other images in the same cross-section:

$$D(C_i, C_j) = \max\{\sup_{x \in C_i} \inf_{y \in C_j} \|x-y\|, \sup_{y \in C_j} \inf_{x \in C_i} \|x-y\|\};$$

Wherein, $D(C_i, C_j)$ represents the similarity of the edge contour between a certain image i and a certain image j on the same cross-section; C represents the set of points of the cardiac edge and internal contour of a certain image i on the cross-section; $C_j$ represents the set of points of the cardiac edge and internal contour points of a certain image j on the cross-section; x represents a certain point within the set $C_j$; y represents a certain point within the set $C_j$; $\|x-y\|$ represents the Euclidean distance between point x and point y; inf represents the infimum operator, which indicates finding the minimum value among all possible values, and $\inf_{y \in C_j} \|x-y\|$ represents to find the value that minimizes $\|x-y\|$ among all possible $y \in C_j$; sup represents the supremum operator, which indicates finding the maximum value among all possible values, and $\sup_{x \in C_i} \inf_{y \in C_j} \|x-y\|$ represents to find the value that maximizes $\inf_{y \in C_j} \|x-y\|$ among all possible $x \in C_i$;

S132: Set a similarity threshold ε, and put all images with edge contour similarity less than the similarity threshold into the same group, and in each group, the edge contour similarities between any two images are all less than the similarity threshold E; suppose there are n groups in total;

S133: Fuse the images in each group:

$$L_k = \frac{1}{k_m} \sum_{p=1}^{k_m} L_{k,p};$$

$L_k$ represents the fused image in the k-th group; km represents the total number of images in the k-th group; $L_{k,p}$ represents the p-th image in the k-th group;

S134: Perform comprehensive fusion on the fused images of each group to obtain the standardized fused image of the cross-section:

$$L_b = \sum_{k=1}^{n} \frac{L_k \cdot \left(1 + \ln\left(1 + \frac{\beta \cdot k_m}{M}\right)\right)}{\sum_{k=1}^{n} \left(1 + \ln\left(1 + \frac{\beta \cdot k_m}{M}\right)\right)};$$

$L_b$ represents the standardized fused image corresponding to cross-section b; β represents an amplification coefficient with a value greater than 1; M represents the total number of images on cross-section b.

Specifically, the structural features of the patient's heart include, but are not limited to, myocardial thickness, cardiac chamber dimensions, and cardiac morphology.

By acquiring comprehensive information from cardiac cross-sectional image data at multiple time points, the system improves the integrity and reliability of the image data; by extracting cardiac edge and internal contour using a threshold segmentation method, the system establishes a foundation for subsequent image similarity calculation and fusion; by calculating edge contour similarity to perform image grouping, the system ensures high similarity within each group and improves the quality of the fused image; through weighted fusion based on the number of images in each group to obtain high-quality standardized fused images, the system ensures that the images input into the CNN feature recognition model have higher accuracy and clarity, further providing a reliable basis for subsequent diagnosis and treatment.

Further, the functional feature extraction unit performs imaging analysis by combining cardiac MRI image data and Doppler imaging data to obtain the patient's cardiac functional features; these features include, but are not limited to, systolic and diastolic function features, myocardial motion velocities, and blood flow velocities.

Embodiment 2

This embodiment includes all features of any preceding embodiment and incorporates further improvements based thereon.

This embodiment provides a system for detecting myocardial damage based on imaging characteristics, which comprises an image acquisition module, a feature extraction module, a data processing module, and a report generation module.

The image acquisition module is configured to acquire high-resolution cardiac imaging data; the feature extraction module is configured to extract cardiac structural and functional feature information from the acquired imaging data; the data processing module is configured to analyze and identify myocardial damage based on the extracted feature information; the report generation module is configured to generate medical reports for physicians regarding myocardial damage.

The data processing module comprises a myocardial injury analysis unit and a deterioration severity assessment unit; the myocardial injury analysis unit analyzes the type and severity level of the patient's myocardial damage based on the structural features and functional features of the patient's heart; the deterioration severity assessment unit evaluates the deterioration trend of the patient's myocardial damage by incorporating analytical data on the patient's myocardial damage from historical data.

Further, the myocardial injury analysis unit performs a quantitative assessment of the type and severity of myocardial damage by integrating and concatenating the structural and functional features of the patient's heart into a pretrained myocardial damage neural network recognition model.

Figure 3:
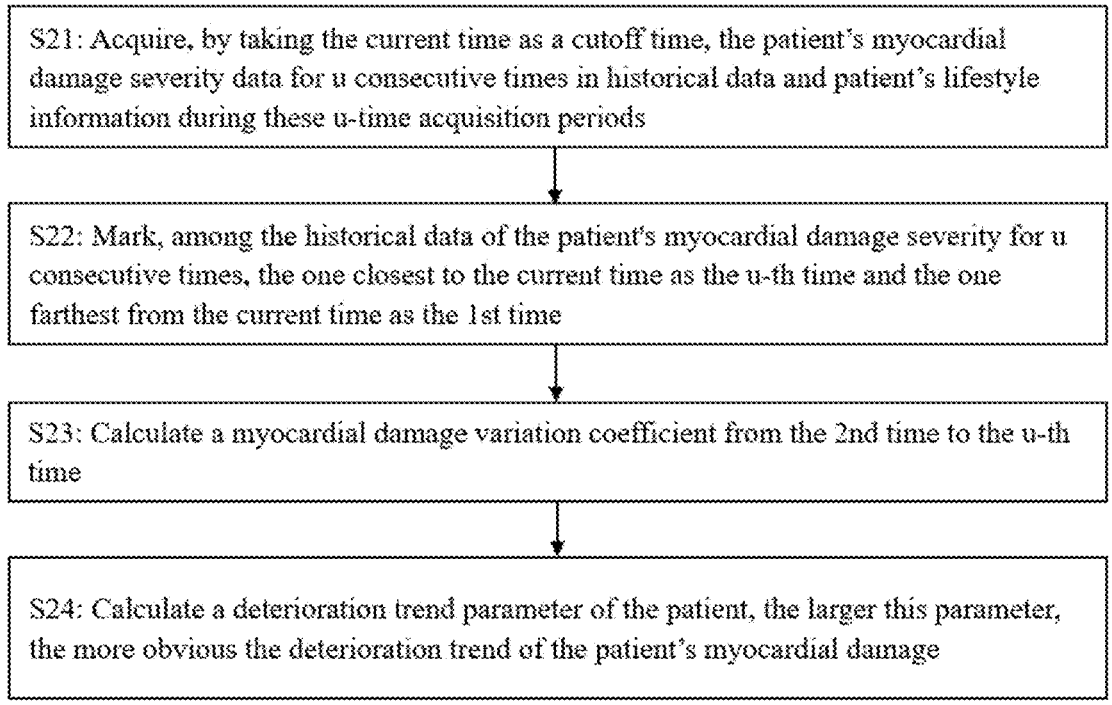
FIG. 3 is a schematic diagram of the workflow of the deterioration trend assessment unit of the present invention.

Further, as shown in FIG. 3, the deterioration severity assessment unit performs the assessment of the patient's myocardial damage deterioration trend through the following steps:

S21: Acquire, by taking the current time as a cutoff time, the patient's myocardial damage severity data for u consecutive times from historical data and the patient's lifestyle information during these u-time acquisition periods;

S22: Mark, among the historical data of the patient's myocardial damage severity for u consecutive times, the one closest to the current time as the u-th time and the one farthest from the current time as the 1st time;

S23: Calculate a myocardial damage variation coefficient from the 2nd time to the u-th time:

$$F_r = \begin{cases} f_r - f_{r-1}, & f_r > f_{r-1} \\ 0, & f_r \leq f_{r-1} \end{cases};$$

Wherein, $F_r$ represents the myocardial damage variation coefficient at the r-th time, $f_r$ represents the quantitative assessment value of the patient's myocardial damage severity in the r-th historical data; it satisfies $2 \leq r \leq u$;

S24: Calculate a deterioration trend parameter of the patient:

$$Q = \sum_{r=2}^{u} \frac{2F_r \cdot (1 - \exp(-\alpha \cdot \theta_r))}{(1+u)u}$$

Wherein, Q represents the patient's deterioration trend parameter the larger this parameter, the more obvious the deterioration trend of the patient's myocardial damage; $\theta_r$ represents an evaluation parameter for the patient's bad habits during the acquisition period from the (r−1)-th to the r-th time, which can be set by physicians based on the patient's lifestyle information and clinical expertise, with a value range of (0,1); α represents a preset amplification coefficient with a value range of [1,5].

By comprehensively analyzing multiple historical data points and the patient's lifestyle information, the deterioration trend assessment unit can more comprehensively understand the changes in the patient's myocardial damage, thereby providing more accurate assessment results; by acquiring the variation coefficients of myocardial damage at multiple time points from historical data, the system can timely identify the deterioration trend of myocardial damage in the patient during different periods; by combining timeline data and the patient's lifestyle information to provide an assessment weight for the deterioration trend parameter and analyzing the patient's myocardial damage deterioration trend based on the deterioration trend parameter, the system can alert physicians to intervene in potential risk, thereby improving the patient's overall health.

Further, the medical report information generated by the report generation module comprises the analysis results of the myocardial injury analysis unit and the assessment results of the deterioration severity assessment unit.

The above-disclosed content is merely a preferred and feasible embodiment of the present invention and does not limit the scope of protection of the present invention. Therefore, all equivalent technical modifications based on the contents of this specification and drawings fall within the scope of protection of the present invention. Additionally, elements of the invention may be updated as technology advances.

What is claimed is:

1. A system for detecting myocardial damage based on imaging characteristics, characterized by comprising an image acquisition module, a feature extraction module, a data processing module, and a report generation module;

the image acquisition module is configured to acquire high-resolution cardiac imaging data; the feature extraction module is configured to extract cardiac structural and functional feature information from the acquired high-resolution cardiac imaging data; the data processing module is configured to analyze and identify myocardial damage based on the extracted feature information; the report generation module is configured to generate medical reports for physicians regarding myocardial damage;

the image acquisition module comprises an imaging acquisition unit and an imaging preprocessing unit; the image acquisition unit is configured to acquire the patient's cardiac imaging data by utilizing high-resolution medical imaging devices, comprising MRI image data and Doppler imaging data within multiple cardiac cycles; the imaging preprocessing unit is configured to preprocess the acquired high-resolution cardiac imaging data;

the feature extraction module comprises an anatomical feature extraction unit and a functional feature extraction unit; the anatomical feature extraction unit is configured to extract structural features of the patient's heart based on the preprocessed high-resolution cardiac imaging data; the functional feature extraction unit is configured to extract functional features of the patient's heart based on the preprocessed high-resolution cardiac imaging data;

the data processing module comprises a myocardial injury analysis unit and a deterioration severity assessment unit; the myocardial injury analysis unit analyzes the type and severity level of the patient's myocardial damage based on the structural features and functional features of the patient's heart; the deterioration severity assessment unit evaluates the deterioration trend of the patient's myocardial damage by incorporating analytical data on the patient's myocardial damage from historical data;

the anatomical feature extraction unit performs extraction of the structural features of the patient's heart through the following steps:

S11: acquire MRI image data from the preprocessed high-resolution cardiac imaging data; the MRI image data includes cardiac cross-sectional image data at multiple time points within multiple cardiac cycles;

S12: for all cross-sectional image data, perform threshold segmentation method to obtain cardiac boundary and internal contour information corresponding to each cardiac cross-sectional image;

S13: for the images at multiple time points on each cross-section, perform fusion based on the cardiac edge and internal contour information corresponding to each image to obtain standardized fusion images for each cross-section;

S14: input the standardized fused images on all cross-sections into a pre-trained CNN feature recognition model to obtain the structural features of the patient's heart;

Specifically, in the step S13, the standardized fused image of each cross-section is obtained through the following steps:

S131: for each cross-section, calculate a similarity value of the edge contour between each image in the cross-section and all other images in the same cross-section:

$$D(C_i, C_j) = \max\{\sup_{x \in C_i} \inf_{y \in C_j} \|x-y\|, \sup_{y \in C_j} \|x-y\|\};$$

wherein, $D(C_i, C_j)$ represents the similarity value of the edge contour between a certain image i and a certain image j on the same cross-section; $C_i$ represents the set of points of the cardiac edge and internal contour of a certain image i on the cross-section; $C_j$ represents the set of points of the cardiac edge and internal contour points of a certain image j on the cross-section; x represents a certain point within the set $C_j$; y represents a certain point within the set $C_1$; $\|x-y\|$ represents the Euclidean distance between point x and point y; inf represents the infimum operator, which indicates finding the minimum value among all values y belonging to the set $C_j$, and $\inf_{y \in C_j}\|x-y\|$ represents to find the value that minimizes $\|x-y\|$ among all possible $y \in C_j$; sup represents the supremum operator, which indicates finding the maximum value among all values x belonging to the set $C_i$, and $\sup_{x \in C_i}\inf_{y \in C_j}\|x-y\|$ represents to find the value that maximizes $\inf_{y \in C_j}\|x-y\|$ among all possible $x \in C_i$;

S132: set a predetermined similarity threshold ε, and put all images with edge contour similarity less than the predetermined similarity threshold into the same group, and in each group, the edge contour similarities between any two images are all less than the predetermined similarity threshold E; suppose there are n groups in total;

S133: fuse the images in each group:

$$L_k = \frac{1}{k_m}\sum_{p=1}^{k_m} L_{k,p};$$

$L_k$ represents the fused image in the k-th group; km represents the total number of images in the k-th group; $L_{k,p}$ represents the p-th image in the k-th group;

S134: perform comprehensive fusion on the fused images of each group to obtain the standardized fused image of the cross-section:

$$L_b = \sum_{k=1}^{n} \frac{L_k \cdot \left(1 + \ln\left(1 + \frac{\beta \cdot k_m}{M}\right)\right)}{\sum_{k=1}^{n}\left(1 + \ln\left(1 + \frac{\beta \cdot k_m}{M}\right)\right)};$$

$L_b$ represents the standardized fused image corresponding to cross-section b; β represents an amplification coefficient with a value greater than 1; M represents the total number of images on cross-section b;

the myocardial injury analysis unit performs a quantitative assessment of the type and severity of myocardial damage by integrating and concatenating the structural and functional features of the patient's heart into a pre-trained myocardial damage neural network recognition model.

2. The system according to claim 1, for detecting myocardial damage based on imaging characteristics, wherein the functional feature extraction unit performs imaging analysis by combining cardiac MRI image data and Doppler imaging data to obtain the functional features of the patient's heart.

* * * * *